(12) United States Patent
Chen et al.

(10) Patent No.: US 7,413,427 B1
(45) Date of Patent: Aug. 19, 2008

(54) EJECTION MECHANISM

(75) Inventors: Chih-Yu Chen, Taipei Hsien (TW);
Jian-Guang Huang, Taipei Hsien (TW);
Yun-Qing He, Taipei Hsien (TW);
Chun-Yan Wu, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/745,279

(22) Filed: May 7, 2007

(51) Int. Cl.
*B29C 45/17* (2006.01)
(52) U.S. Cl. .................................. 425/192 R; 425/195
(58) Field of Classification Search ............. 425/192 R, 425/195, 451.9, 139, 182, 188, 193, 236, 425/286, 351, 422, 444, 537, 554, 595
See application file for complete search history.

(56) References Cited

U.S. PATENT DOCUMENTS

| 4,861,254 | A | * | 8/1989 | Takeuchi et al. | ............ 425/190 |
| 4,959,007 | A | * | 9/1990 | Okuyama | .................... 425/577 |
| 6,120,279 | A | * | 9/2000 | Vovan | ......................... 425/190 |

\* cited by examiner

*Primary Examiner*—James Mackey
*Assistant Examiner*—Seyed Masoud Malekzadeh
(74) *Attorney, Agent, or Firm*—WPAT, P.C.; Anthony King

(57) ABSTRACT

The injection die has a mold plate that has a main arm, a compressed board serve to lock down the mold insert within the mold plate and an ejection mechanism. The ejection mechanism has a columned ejector pin with a stopping protruded from one end of the ejector pin, an elastic module installed in the main arm to abut against the ejector pin to provide an elastic force, and a fixed board received in the main arm to withstand one end of the elastic module.

3 Claims, 6 Drawing Sheets

EJECTION MECHANISM

BACKGROUND OF THE INVENTION

1. Field of the Invention

The present invention relates to an injection die, and more particularly to an ejection mechanism for ejecting a mold insert.

2. The Related Art

One type of injection die shown in U.S. Pat. No. 6,120,279, includes a mold insert that lies in a cavity of a mold plate and a pair of positioners serve to lock down the mold insert within the mold plate. Said injection die can satisfy demand of production, but it is difficult to release the mold insert from the mold plate. During unloading, the positioners release the mold insert and then push it up. As a friction between the mold insert and the mold base is big, the mold insert can't be easily extracted from the mold plate.

Thus, it would be desirable to provide an injection die loaded with an ejection mechanism which overcomes the problems encountered with previously injection die.

SUMMARY OF THE INVENTION

An object of the present invention is to provide an injection die loaded with a ejection mechanism for releasing a mold insert rapid.

The injection die has a mold plate which has a main arm with a holding passage defined in the front of the main arm, and with a holding groove defined at the back of the main arm, and has a mold insert loaded in the mold plate, and has a compressed board serve to lock down the mold insert within the mold plate, and has an ejection mechanism. The ejection mechanism has a columned ejector pin with a stopping protruded from one end of the ejector pin, an elastic module installed in the holding passage to abut against the ejector pin to provide an elastic force, and a fixed board received in the holding groove to withstand one end of the elastic module.

As described above, when the mold insert is secured to the mold plate by the compressed board, the ejection mechanism is able to withstand the mold insert. Once demounting the compressed board, the ejection mechanism can be able to spring the mold insert and the mold insert is impelled to leave the initial position of the mold plate slightly. Therefore the mold insert can be easily disassembled from the mold plate within a small friction between them.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
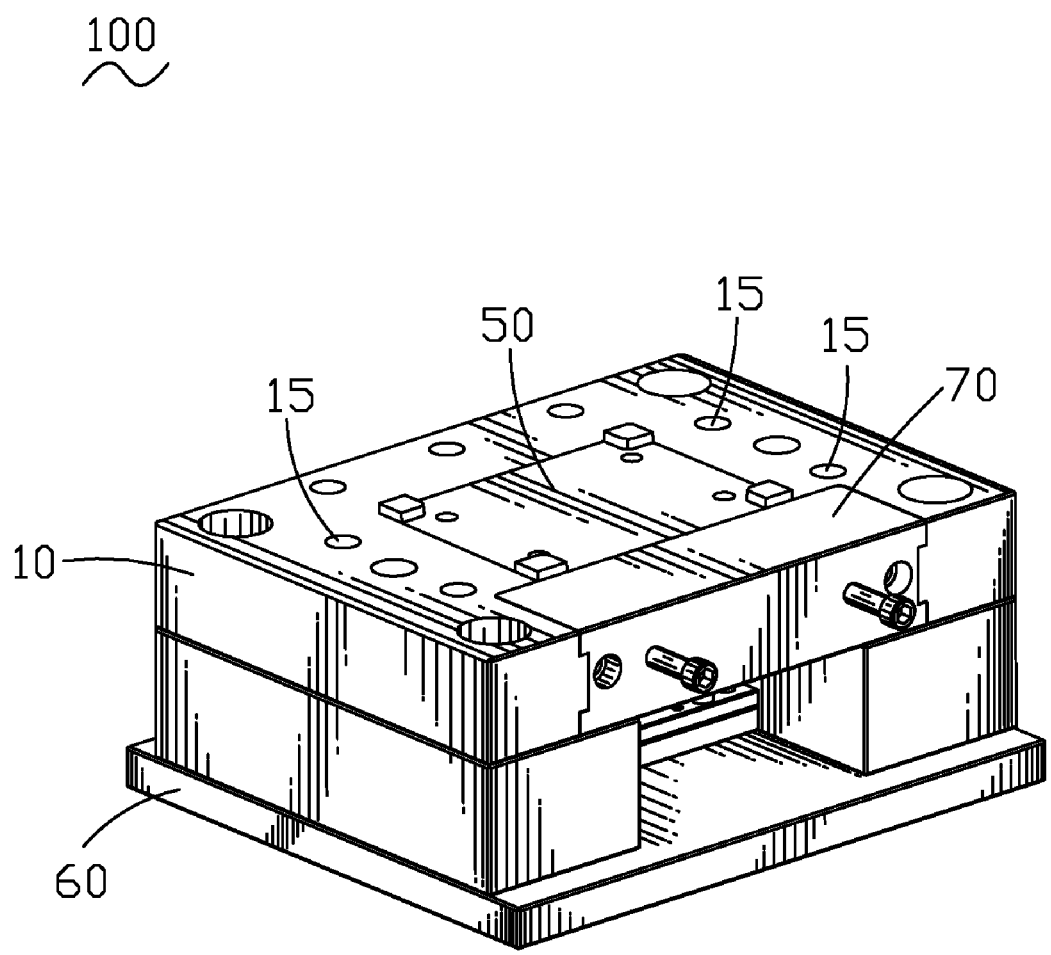
FIG. 1 is a perspective view of an injection die in accordance with the present invention.
Figure 2:
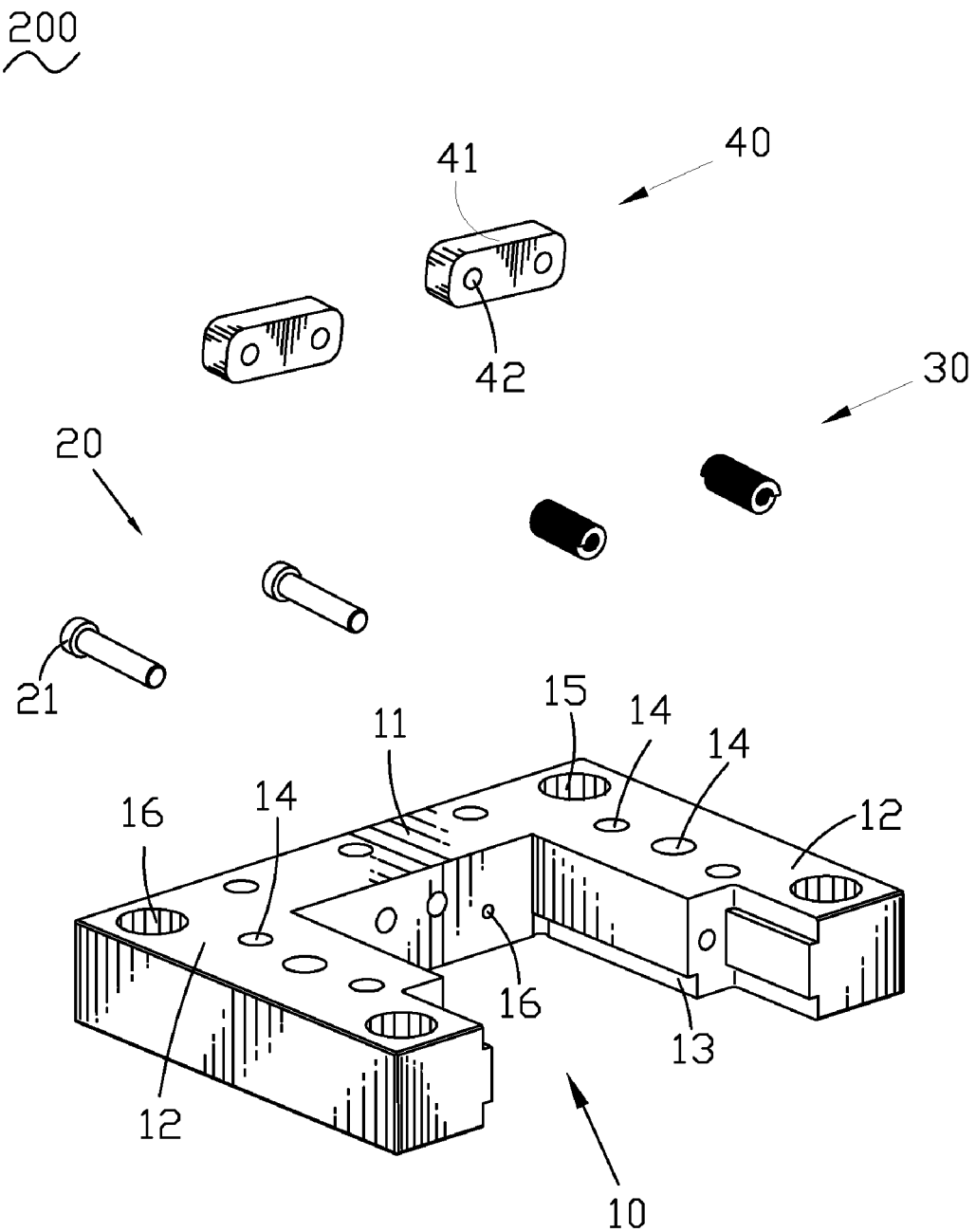
FIG. 2 is an exploded view of the injection die in accordance with the present invention.

With reference to FIGS. 1-2, an ejection mechanism 200 is assembled in an injection die 100 which has a mold plate 10 on which a mold insert 50 is loaded, a fixed plate 60 secured on one side of the mold plate 10 and a compressed board 70 for positioning the mold insert 50 in the mold plate 10.

Figure 3:
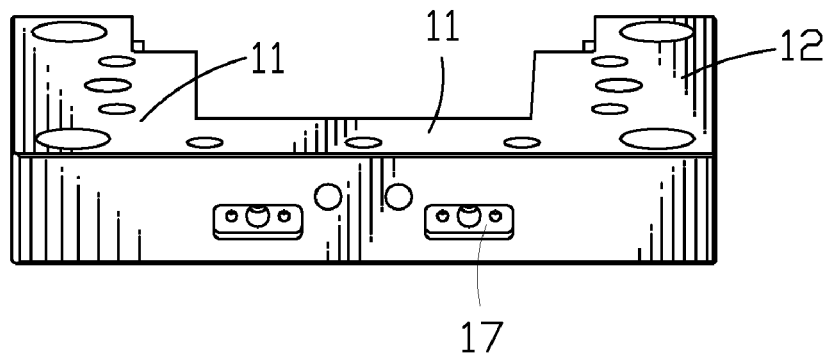
FIG. 3 is another perspective view of a mold plate of the injection die shown in FIG. 2.

Referring to FIGS. 2-3, the mold plates 10 comprise a main arm 11 and two branch arms 12 extending from laterally opposite of the main arm 11. The mold plate 10 has a cavity formed between the main arm 11 and the branch arms 12, and has two slots 13 extending along the inner surface of the branch arms 12. One slots 13 connects to the main arm 11 at a right angle and the other slots 13 connects to the main arm 11 at an obtuse angle. A plurality of located holes 14 and grafting holes 15 are disposed in the corresponding location of the mold plate 10. A holding passage 16 is defined in the front of the main arm 11 with a holding groove 17 defining at the back of the main arm 11 to share a same axis and connect with the holding passage 16.

Figure 4:
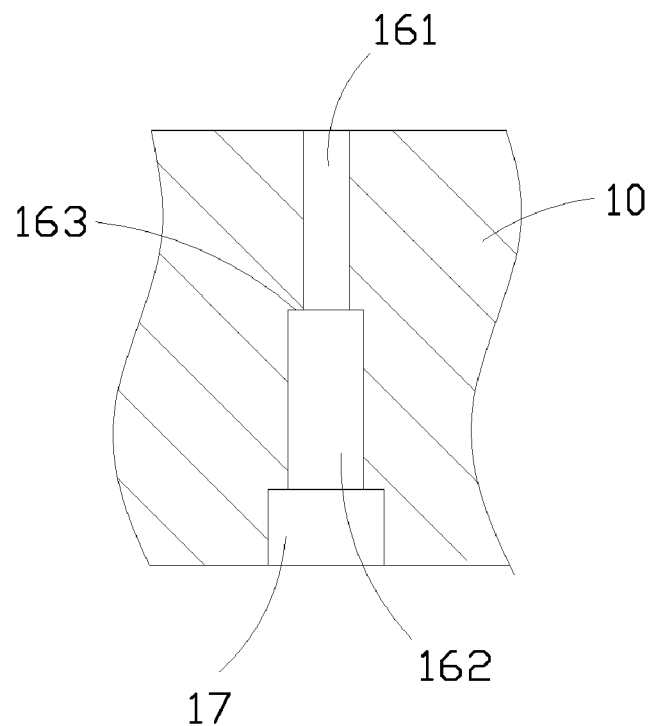
FIG. 4 is a sectional view of a holding passage of an ejection mechanism.

Referring to FIGS. 2 and 4, the holding passage 16 has a holding hole 161 located at one end of the holding passage 16, a joining hole 162 located at another end of the holding passage 16 and a shoulder 163 is mounted between the holding hole 161 and the joining hole 162.

Referring to FIG. 2, the ejection mechanism 200 installed in the main arm 11 has a columned ejector pin 20 with a stopping 21 protruded from one end of the ejector pin 20, and has a spring 30 as an elastic module for storing up an elastic energy to withstand the stopping 21. Radius of the stopping 21 is equal to radius of the joining hole 162.

Referring to FIGS. 2-3, a fixed board 40 received in the holding groove 16 withstands another end of the spring 30. The fixed board 40 includes a partition 41 and two traveling holes 42 defined on the partition 41 therethrough.

Figure 5:
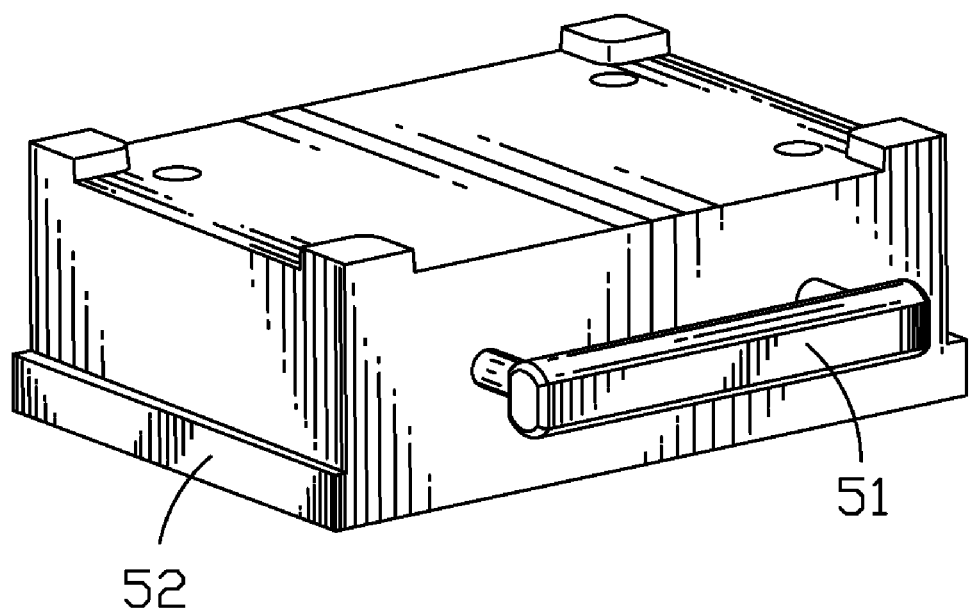
FIG. 5 is a perspective view of a mold insert of the injection die.

Referring to FIGS. 2 and 5, a handle 51 is mounted at one side of the mold insert 50. Two gibbous ribs 52 formed along both sides of the mold insert 50 are slideable in forward and rearward position along the slots 13.

Figure 6:
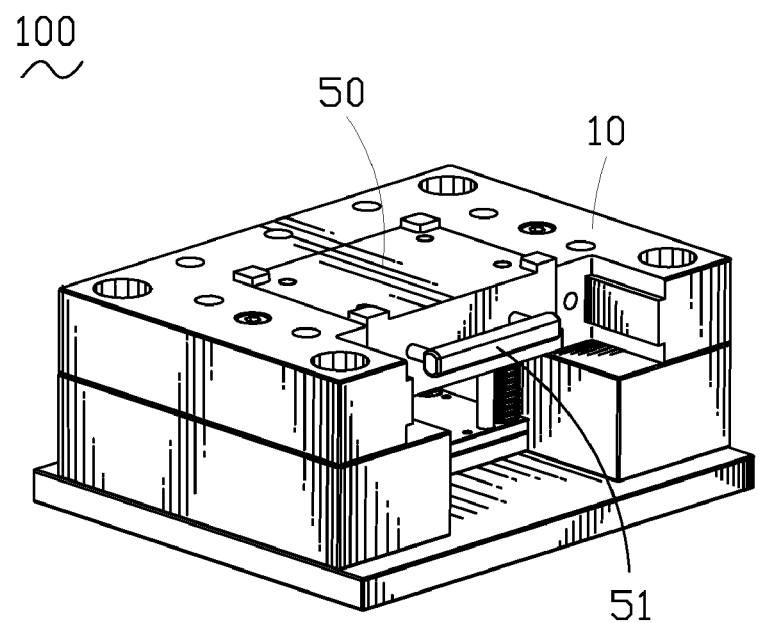
FIG. 6 is a diagram of the injection die, with a compressed board being removed.
Figure 7:
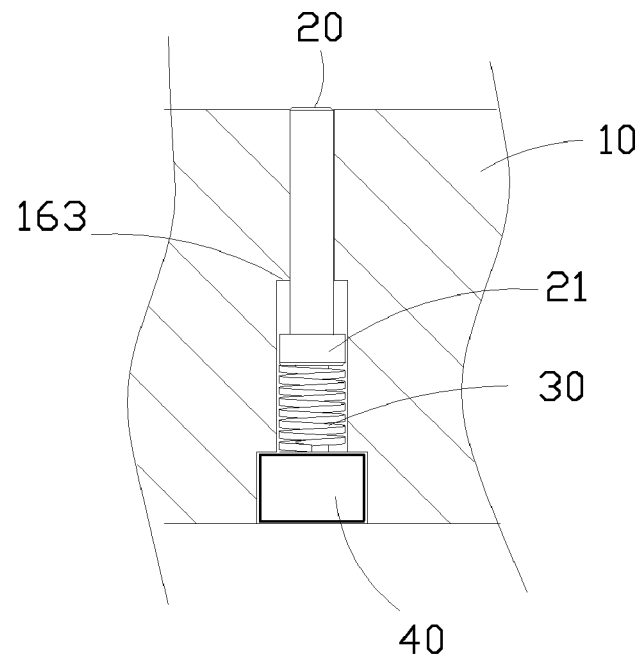
FIG. 7 is a cross-sectional view of a holding passage of the ejection mechanism in accordance with the present invention, with a pin and a spring being inserted.
Figure 8:
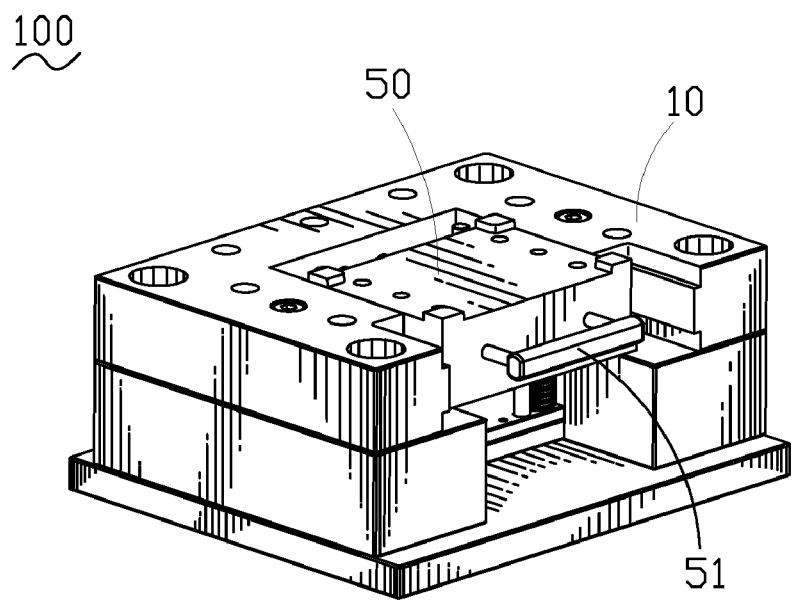
FIG. 8 is a further diagram of the injection die shown in FIG. 6.
Figure 9:
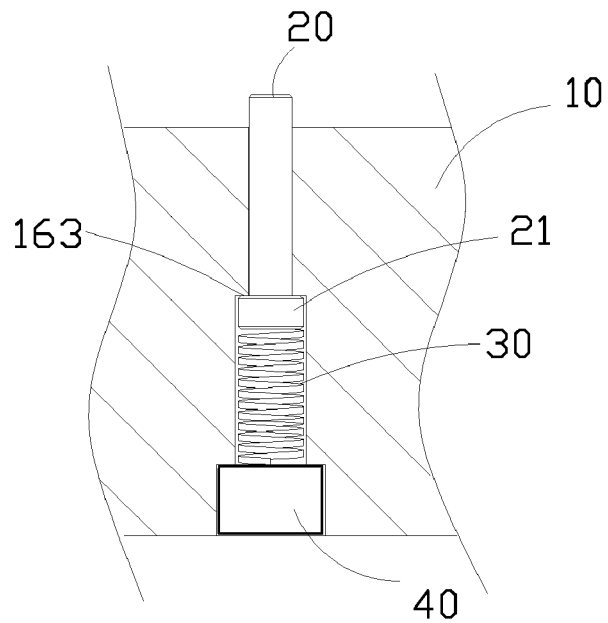
FIG. 9 is a sectional diagram of the moving shown in FIG. 7.

Referring to FIGS. 4, 6 and 7, in assembly, the ejector pin 20 is installed in the holding passage 16 and passes through the joining hole 162 and the holding hole 161 to abut against the mold insert 50 loaded in the mold plate 10. Meanwhile, the spring 30 is installed in the holding passage 16 follow the trace of the ejector pin 20 to withstand the ejector pin 20. The fixed board 40 is secured to the holding groove 17 with a plurality of screws through the traveling holes 42. One end of the spring 30 withstands the stopping 21 of the ejector pin 20, and the other end of the spring 30 withstands the fixed board 40. The ejection mechanism 200 withstands the mold insert 50 to store up the elastic potential energy.

Referring to FIGS. 1, 2, 8 and 9, while unloading the mold insert 50, the compressed board 70 secured to the mold plate 10 is released to move away from the mold plate 10, and then the mold insert 50 is pushed with a force with which the ejection mechanism 200 provides along the slots 13, and the mold insert 50 can be easily extracted from the mold plate 10 with an external force after being stapled. The ejector pin 20 abuts against the mold insert 50 until the stopping 21 arrives at the shoulder 163.

As described above, the ejector pin 20 is slidable along the holding passage 16 to withstand the mold insert 50. The mold insert 50 installed in the mold plate 10 can be easily disassembled from the mold plate 10 within the small friction between them when the mold insert 50 departs from its initial position. The foregoing description of the present invention is illustrative and explanatory thereof, and various change in the shape and components as well as in the details of the illustrated construction.

What is claimed is:

1. An ejection mechanism for ejecting a mold insert, comprising:
    a mold plate having a main arm with a holding passage which is defined in the front of the main arm, and with a holding groove which is defined at the back of the main arm, the mold insert loaded in the mold plate;
    a compressed board for positioning the mold insert in the mold plate;
    a columned ejector pin with a stopping protruded from one end of the ejector pin;
    an elastic module installed in the holding passage to abut against the ejector pin to provide an elastic force; and
    a fixed board received in the holding groove to withstand one end of the elastic module,
    wherein the mold plate has two branch arms extending from opposite sides of the main arm, and has a cavity which receives the mold insert that is formed between the main arm and the branch arms,
    wherein the fixed board has a partition and two traveling holes defined on the partition therethrough, the fixed board is secured to the holding groove with a plurality of screws through the traveling holes,
    wherein ejector pin is installed in the holding passage and passes through the holding passage to abut against the mold insert loaded in the mold plate.

2. The ejection mechanism according to claim 1, wherein the holding groove shares a same axis and connects with the holding passage.

3. The ejection mechanism according to claim 1, wherein the elastic module is a spring.

* * * * *